April 3, 1928.

R. McMILLAN ET AL 1,665,143

COFFEEPOT

Filed June 24, 1927

M. R. Schall
Randall McMillan
INVENTORS

BY Victor J. Evans
ATTORNEY

WITNESS:

Patented Apr. 3, 1928.

1,665,143

UNITED STATES PATENT OFFICE.

RANDAL McMILLAN AND MYRON R. SCHALL, OF PALO ALTO, CALIFORNIA.

COFFEEPOT.

Application filed June 24, 1927. Serial No. 201,210.

This invention has reference to an attachment for coffee urns or pots for brewing what is generally known as drip coffee.

The object of the invention is the provision of an attachment designed to be received in the neck portion of the pot and which provides a receptacle for the finely ground coffee, said attachment having a body that is preferably flared downwardly to the center thereof, and provided with an opening at its said center, and wherein a valve having an upstanding stem is employed for normally closing the opening so that the coffee in the device may be steeped, and after the expiration of the proper time for steeping the valve is opened to allow the liquid contents in the upper half of the coffee pot to filter through a fine screen or cloth into the lower half of the coffee pot, which screen provides an important element of the improvement, and whereby drip coffee may be brewed in an easy and expeditious manner.

A further object is the provision of an attachment for coffee pots and urns that serves as a holder for the finely ground coffee in the steeping thereof and which also provides a measuring device for the desired amount of boiling water to be added to the finely ground coffee.

To the attainment of the foregoing the invention consists in the improvement as hereinafter described and definitely claimed.

Figure 1:
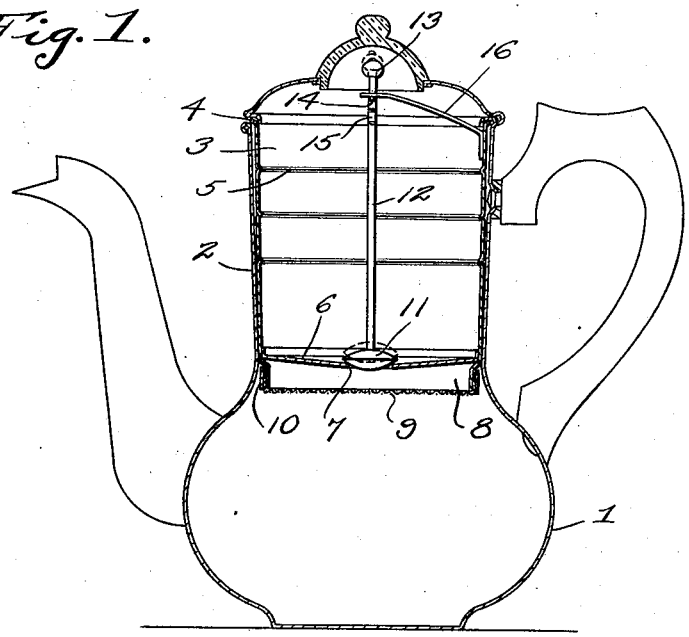
Figure 1 is an approximately central vertical sectional view through a coffee urn or pot embodying the improvement.
Figure 3:
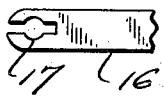
Figure 3 is a detail plan view of the guide for the stem of the valve and which also serves as a handle for inserting and removing the steeping chamber of the coffee pot.
Figure 2:
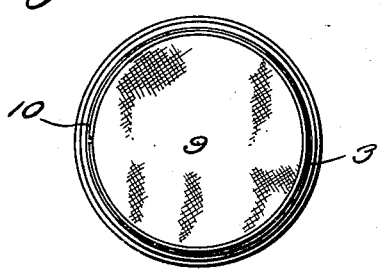
Figure 2 is a bottom plan view of the improvement.
Figure 4:
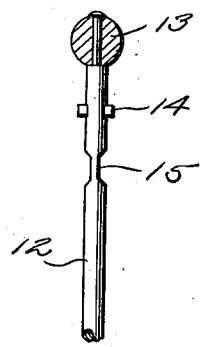
Figure 4 is a side elevation of the upper portion of the valve stem.

In the showing of the drawings, a coffee pot 1 is provided with an extending neck portion 2. It is to be understood that my improvement may be arranged in coffee pots, or urns of other constructions than that shown by the said Figure 1.

The improvement comprises a container 3 which is preferably round in plan and which has its open end flanged, as at 4, to contact with the beaded mouth of the neck 2 of the pot 1. The container 3 is, at predetermined spaced intervals, formed with inwardly directed continuous ribs 5, and these ribs are in the nature of graduations whereby the exact amount of boiling water may be determined without necessitating the measuring or guessing of the proper amount to add to the finely ground coffee. The container 3 is provided with a bottom 6. This bottom is flared outwardly to the center thereof, and the said center is formed with an opening 7. The body of the container is continued beyond the bottom 6, the said body, at its juncture with its bottom, is preferably rounded inwardly and from thence outwardly so that its extending portion 8 is reduced. On the outer end of the extension 8 there is arranged a closely woven cloth or like fabric filtering medium 9, the edges of which contacting with the extension and being held thereagainst by a spring binding ring 10.

Normally closing the opening 7 there is a valve 11. The valve preferably has its active face rounded. A stem 12 is centrally secured to the valve, and this stem has its outer end formed with a head 13. Below the head the stem is formed with laterally extending lugs 14 and below the lugs the opposite faces of the stem are notched, as at 15. Having one end secured to the inner side of the container 3 there is an arched guide and handle 16. This attachment 16, at its outer end is formed with a key-hole slot 17 whose enlarged passage is at the center of the container 3 and directly in a line with the hole in the bottom of said container. The guide is designed to secure the stem of the stopper in its proper position and to serve as a handle for inserting and removing the steeping chamber 3. By turning the valve the stem may be raised through the key hole frame and the walls of the said opening arranged opposite the notches 15. The valve stem is again given a half turn and the spring will then engage with the shoulders provided by the notches to hold the valve raised.

The proper quantity of finely ground coffee is placed in the container and the proper amount of hot water is poured thereon and left to steep for the proper length of time. Thereafter the valve stem is operated to raise the valve which permits the coffee to drip through the opening 7 and through the strainer or filtering cloth 9 into the heated water in the bowl of the pot 1. No grounds will be permitted to enter the bowl but the flow of the liquid from the container is rapid so that drip coffee may be quickly brewed with the improvement.

Having described the invention, we claim:—

A coffee pot, a container inserted through the mouth and received through the neck thereof, said container having a flared bottom which is centrally formed with an opening and having a reduced extension beyond said bottom, a filtering fabric arranged around the extension, a clamping ring securing the fabric on the extension, a valve for closing the opening in the bottom of the container, an operating stem for the valve, said stem having laterally extending lugs and notches below the lugs, an arched combination guide and handle member having one end secured in the container and its other end provided with a notch which is centrally widened and in which the stem is received, and whereby when the stem is arranged in one position the said member will contact with the lugs and when raised and turned to a second position the walls provided by the notch will contact with the shoulders formed by the notches in the stem.

In testimony whereof we affix our signatures.

RANDAL McMILLAN.
MYRON R. SCHALL.